United States Patent [19]

Yost

[11] Patent Number: 4,984,382

[45] Date of Patent: Jan. 15, 1991

[54] TRAP ACTUATED BY AN ANIMAL'S WEIGHT

[76] Inventor: Christopher Yost, #2, 273 Lakeshore Rd., E. Mississauga, Ontario, Canada, L5G 1G8

[21] Appl. No.: 315,281

[22] Filed: Feb. 24, 1989

[30] Foreign Application Priority Data

Oct. 21, 1988 [CA] Canada .................................. 581088

[51] Int. Cl.$^5$ ............................................. A01M 23/02
[52] U.S. Cl. .......................................... 43/61; 43/64; 43/65
[58] Field of Search ..................... 43/60, 61, 64, 65, 67

[56] References Cited

U.S. PATENT DOCUMENTS

| | | | |
|---|---|---|---|
| 224,498 | 2/1880 | Wiggins | 43/60 |
| 472,386 | 4/1892 | McLeod | 43/60 |
| 491,309 | 2/1893 | Herman | 43/60 |
| 3,733,735 | 5/1973 | Hirsch | 43/61 |
| 4,238,903 | 12/1980 | Mazzei | 43/61 |
| 4,291,486 | 9/1981 | Lindley | 43/61 |
| 4,379,374 | 4/1983 | Lindley | 43/61 |

Primary Examiner—Nicholas P. Godici
Assistant Examiner—Michael William Starkweather
Attorney, Agent, or Firm—Donald E. Hewson

[57] ABSTRACT

An animal trap for catching animals in an unharmed manner, comprises a cage having a top, a bottom, a pair of side walls, a first end wall, and a second end wall. There is an opening in said cage, and a door means located in the first end wall. A platform is adapted to receive and retain bait used to attract animals and also adapted to receive at least a portion of the body of an animal to be trapped, said platform having a set position and an actuated position, with retaining means for retaining said platform in said set position. The retaining means releases the platform upon introduction of at least a portion of the weight of the animal, whereby the platform is moved from its set position to its actuated position upon being released. The door means has a set position and an actuated position, and is in the set position when the platform is in its set position. Upon actuation of the platform, the position of said door means is contingent upon the position of the platform so that the opening is substantially obstructed by the door means when it is in its actuated position.

15 Claims, 2 Drawing Sheets

TRAP ACTUATED BY AN ANIMAL'S WEIGHT

FIELD OF THE INVENTION

This invention relates to animal traps adapted to trap animal in a humane manner, and more particularly to traps for capturing smaller animals such as rodents. Also considered is the safe and easy release of the animal in an unharmed condition.

BACKGROUND OF THE INVENTION

The trapping of animals is a problem that has been dealt with by mankind for several thousand years, yet, mankind has never developed an animal trap adapted to capture animals, that is completely satisfactory. Several types of traps have been developed, including ones that administer poison, and ones that use a sprung arm to physically trap or injure the animal, to name a few. Many such traps are harmful or even deadly to the animal being captured, while many such traps are quite messy to use. Some traps are even dangerous to the user.

Various traps have been developed that do capture animals alive and unharmed, but such traps have their drawbacks as discussed in the subsequent section.

DESCRIPTION OF THE PRIOR ART

U.S. Pat. No. 4,238,903 to Mazzei, issued Dec. 16, 1980, discloses an animal trap useful for trapping small animals. An animal enters the trap by travelling up an inclined ramp and passing through a circular opening in an entry box. The entry box is slidingly coupled to a trap box and together they comprise an entry box/trap box assembly. The entry box/trap box assembly is held in an elevated position by pivot pins, which are inserted into a pair of slots. The assembly is somewhat delicately balanced, with an entry platform supporting the entry box portion of the assembly. When the animal enters the trap through an opening, it typically travels toward the trap box where bait has been placed. The weight of the animal causes the trap box/entry box assembly to become unbalanced, thus causing it to swing such that the trap box travels downwardly. The entry box/trap box assembly then becomes oriented vertically. The entry box slides downwardly into the trap box, thus covering the opening therein, thereby precluding the animal from escaping. In order to remove the animal, the entry box is slid outwardly from the trap box by pulling on an attached handle.

There are a number of potential problems associated with this type of trap. It may be actuated externally without the rodent entering the trap. The inclusion of a ramp makes it more difficult for the rodent to enter the trap. It is possible for two rodents to enter the trap at the same time and for one of them to balance the other thereby allowing the bait to be retrieved without actuating the trap. Also, the method of releasing the rodent from the trap is more difficult than necessary.

U.S. Pat. No. 4,291,486 to Lindley, issued Sept. 29, 1981, discloses an animal trap wherein an animal climbs a ramp-like structure to enter a vertically disposed cylindrical trap. The trap has an inner cylinder and an outer cylinder. The animal enters the inner cylinder through an aperture, and then falls to the bottom of the inner cylinder where the animal is supported by a trigger plate. The trigger plate is made of a strong but slightly flexible material and is pivoted on one side. Located on the side opposite to the pivot is a latch member, which is an integral part of the trigger plate. The latch member is slidably retained at the bottom of the inner cylinder by a T-shaped retainer member, which is part of the inner cylinder. The latch member extends slightly beyond the diameter of the inner cylinder. An elongated aperture is located in the latch member such that the T-shaped retainer member can slide throughout the length of the aperture.

When the animal falls onto the trigger plate, the trigger plate rotates around the pivot and moves downwardly in the area of the latch member. This causes the latch member to slide inwardly toward the center of the trigger plate. When the latch member slides inwardly, it no longer is displaced overtop the tab member. Resultingly, the inner cylinder falls downwardly to the bottom of the outer cylinder, thus trapping the animal. The inner and outer cylinders are held in sealed relation in this position, thus eventually suffocating the animal. The animal is removed by sliding the inner and outer cylinders apart. In an alternative embodiment, a different but functionally very similar latching mechanism is used.

There are a number of potential problems associated with this type of trap. It may be actuated externally without the animal entering the trap, and the unit is fairly easy to tip. The inclusion of a ramp makes it more difficult for the animal to enter the trap. It is possible for two animals to enter the trap at the same time and for one of them to balance the other thereby allowing the bait to be retrieved without actuating the trap. The method of releasing the animal from the trap is more difficult than necessary. A moving mechanical mechanism operates in order to allow for entrapment of the animal, which could potentially fail.

U.S. Pat. No. 4,379,374 to Lindley, issued Apr. 12, 1983, discloses an animal trap having an enclosure attached to a base member, wherein the enclosure pivots downwardly to trap an animal therein. In order to set the trap, the front end of the trap is lifted, usually by lifting an attached flap, and the end of the latch arm is placed at the stop on the upstanding post. The other end of the latch arm is attached to a biasing hinge, which supports the weight of the raised enclosure, and is typically made from a flexible metal. The biasing hinge is also attached to a trigger means via a short arm. The trigger means provides a place for retaining bait and also a shelf for receiving the paws of an animal. The trap is triggered when an animal places sufficient weight on the trigger plate.

An animal enters the enclosure through a door after ascending a flap that has been lowered to act as a ramp. It then crawls around the U-shaped passage and onto the shelf to get at the bait. The trigger means is supported pivotably by a pin. The weight of the mouse on the shelf pivots the latch arm and integral short arm, which subsequently pulls on the flexible hinge, until the end of the arm is pulled off the post. The enclosure is therefore no longer supported and pivotably falls downwardly onto the base. The flap at the opening is hinged to the bottom of the enclosure, and closes over the doorway of the enclosure, thus trapping the animal.

There are a number of potential problems associated with this type of trap. The inclusion of a ramp makes it more difficult for the animal to enter the trap. The method of releasing the animal from the trap is more difficult than necessary. A moving mechanical mechanism operates in order to allow for entrapment of the animal, which could potentially fail. Furthermore, the actuating mechanism contains many parts, thereby being complicated and expensive. It appears that it would be mechanically difficult to get the actuating mechanism operating correctly because the biasing hinge must hold most of the weight of the trap, yet must move significantly enough to release the mechanism upon the introduction of the weight of a animal. Furthermore, hinge fatigue could result. It is also believed that certain animal traps exist having a rotating or rolling wheel that presents a hazard to an entrapped animal in that the wheel can potentially catch and injure the animal's tail.

SUMMARY OF THE INVENTION

The animal trap of the present invention provides a trap that overcomes the problems associated with prior art animal traps. Disclosed is a trap comprising an external cage and an internal platform and door means. The platform and door means together comprise a trapping mechanism, and work in conjunction with each other, and may even be one integral mechanism. The platform acts as the triggering means of the mechanism and the door closes off the opening to the trap, thus trapping an animal inside. In the preferred embodiment, the trapping mechanism is the only part that moves in order to trap an animal.

The trapping mechanism can be located in at least one of either a set position or an actuated position. It is held in the set position by a retaining means, and in this position. The trapping mechanism is located in an elevated position generally above the opening to the cage, which is therefore unobstructed. Locating the trapping mechanism in a raised position allows it to be actuatable by the weight, or a portion thereof, of an animal. When activated, it travels in a downward direction to the actuated position. In the actuated position, the opening is blocked by a door means, and the platform is at a lower level than before being actuated.

It is possible to have the door means move to its actuated position by gravity alone, or by use of a separate force means, such as a spring, or by using both in conjunction with one another. The trap preferably incorporates a passive actuation means, such as a magnet, as opposed to either an active actuation means or a configuration relying on the balance of one member on another, for keeping the platform in a set position. The use of a passive actuation means is preferable over an active actuation means because it is less apt to malfunction, and as preferable over a balance configuration because of the possible instability of such a configuration.

Another very important feature of the invention presented herein is that it can simply be turned over to release the animal, and the animal will have difficulty escaping immediately thus giving the person releasing the animal time to leave the immediate area.

The means used to receive the animal, in this case a platform, is preferably an integral part of the door means that is used to block the opening in the cage. This is advantageous because the opening will be substantially blocked when the platform moves to its actuated position; there are no intermediate connecting parts that might allow for failure of the opening to be blocked.

It is advantageous for the trapping mechanism to be completely internal such that it is very difficult to actuate it from a position external to the cage. Traps having a platform, or similar, that are not completely enclosed in the cage of the trap, and are therefore not properly protected, risk the chance of being actuated externally, instead of being actuated by an animal entering the trap.

Another advantage of the invention presented herein is that the animal does not need to be fully on the platform to actuate the trapping mechanism.

Another advantage of the invention presented herein is that it is configured so as to preclude an animal from having its tail caught by the trapping mechanism or by any of the moving parts of the trap.

Other advantages are that the trap has a low centre of mass, which means that it is not easy to tip over, and that the animal does not need to travel up a ramp to enter the trap.

Finally, it is preferable to dimension the animal trap of the present invention such that it is of appropriate size for the animal being trapped.

BRIEF DESCRIPTION OF THE DRAWINGS

The invention will now be described by way of example, with reference to the accompanying drawings, in which.

DETAILED DESCRIPTION OF THE PREFERRED EMBODIMENTS

Figure 1:
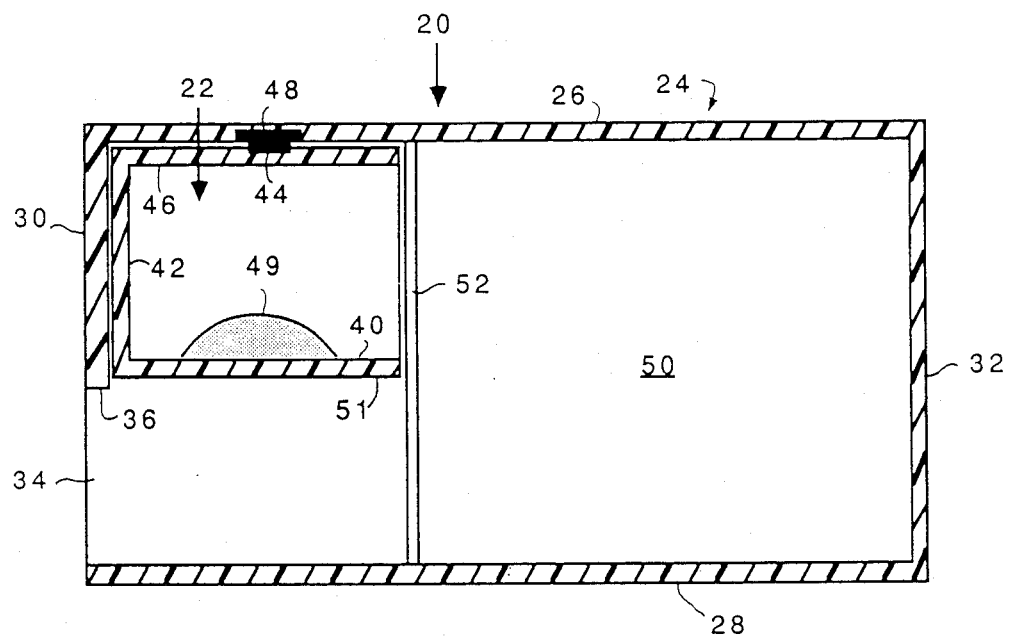
FIG. 1 is a partially cut away side view of the animal trap according to the present invention, showing the platform, with bait thereon, in any set position.

Reference is now made to FIG. 1 in which the animal trap 20 is shown with the trapping mechanism 22 shown in an elevated position, which is the set position. Cage 24 comprises a roof portion 26, a floor portion 28, a first end portion 30, a second end portion 32, and two side portions (not shown). The roof portion 26, the floor portion 28, the second end portion 32, and the side portions are preferably made of a solid material and may have air holes therein to allow for the passage of air. The roof portion may also be slidably or pivotably removable, fully or partially, to facilitate access to the internal portion of the cage 24. The roof portion 26 is also preferably intimately connected to the remainder of the cage 24, such that it may not be opened by an animal.

A material that would allow the cage 24 to be strong and rigid, yet, would also allow for visual inspection of the interior of the cage 24, is preferable. Material such as Plexiglass (TM), or clear plastic, are suitable for use.

The first end portion 30 of the cage 24, does not cover the entire end of the trap. Instead, there is an opening 34 between the floor portion 28 and the bottom portion 36 of the first end portion 30. The opening 34 typically extends from one side of the cage to the other, but this is not necessary.

Inside the cage 24, is trapping mechanism 22, which comprises a platform 40, a door means 42, ceiling portion 46, and a pair of side walls (not shown). In the preferred embodiment, these components are preferably intimately connected. The trapping mechanism 22 is held in an elevated set position by retaining means 44, which is preferably a magnet. If a magnet is used, the magnet may be attached to ceiling portion 46 of the trapping mechanism 22. There is also a receiving means 48 located in roof portion 26, to receive and retain retaining means 44.

Alternative retaining means include Velcro (TM), or a mechanical release mechanism. It is also possible to include some sort of vibration damping material, such as a foamed plastic material (e.g. foamed polyethylene), in conjunction with the retaining means 44 such that the retaining means is partially or substantially shielded from external vibration, which may cause undesired release of the trapping mechanism.

Figure 2:
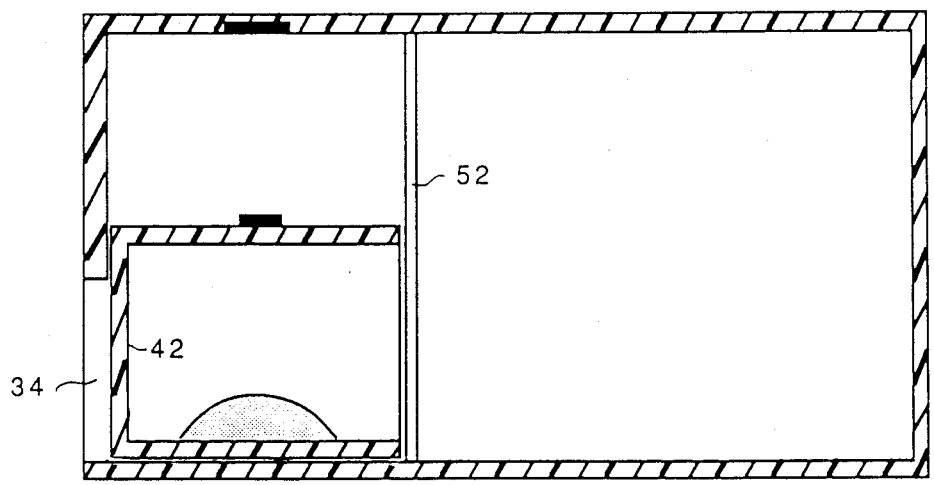
FIG. 2 is a view similar to FIG. 1, except that the platform is now in an actuated position.

In use, the animal trap 20 is set such that floor portion 28 of cage 24 is placed on the ground, and trapping mechanism 22 is placed in its elevated set position. Bait 48 is placed on the platform 40 to entice an animal into the cage 24 of the trap 20. The animal enters the cage 24 through opening 34 and travels underneath platform 40 into the interior 50 of cage 24. It can then approach the bait 48 by stepping up onto platform 40. As the animal puts all or part of its weight onto the platform 40, the retaining means 44 can no longer retain the travelling mechanism 22 in the elevated set position. The trapping means 22 moves via the force of gravity to its actuated position as shown in FIG. 2.

In order for the animal to step up onto the platform, it must be facing with its front generally oriented to the platform. This means that the animal's tail is situated such that it is not near the platform 40, and therefore cannot be trapped by the platform when it falls.

Guide members 52 preclude the trapping mechanism 22 from travelling outwardly away from first end portion 30 and opening 34. Door means 42 substantially obstructs opening 34, thus precluding any trapped animal from exiting the interior 50 of cage 24. It would be very difficult for an animal to lift the trapping mechanism 22 up, and at the same time pass under the platform 40 thereof, thus escaping. It is possible, however, to include a latching means that would preclude easy lifting of the trapping mechanism 22.

In order to release the trapped animal, the cage is simply turned upside down. The door means 42 falls to its set position, and the animal may exit by climbing onto the bottom side 51 of the platform 40. The animal is released unharmed, and with minimal danger to the user since the animal is typically delayed in exiting by having to climb up onto the bottom side 51 of the platform 40 first. The trap 20 is then simply turned rightside up to ready it for use, possibly with the addition of some bait.

If a latching means is used to preclude immediate opening of the door means 42, the latching means must be unlatched before the door means can return to its set position.

Figure 3:
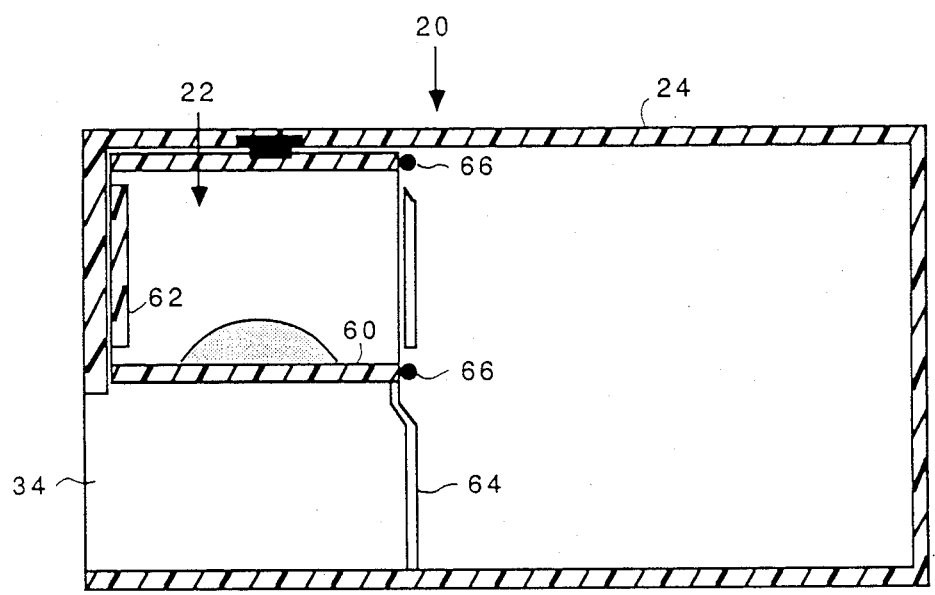
FIG. 3 is a view similar to FIG. 1, except that the platform and door means are not one integral part.

In FIG. 3, an alternative embodiment is shown in which trapping mechanism 22 comprises a platform 60 and a door means 62. In this embodiment, the platform 60 and the door means 62 do not form one integral part. The platform 60 supports door means 62. When an animal puts weight on platform 60, the platform falls slightly and is deflected horizontally when protrusions 63 come in contact with guide members 64, such that platform 60 no longer supports door means 62. Door means 62 then falls freely so as to substantially obstruct opening 34.

Figure 4:
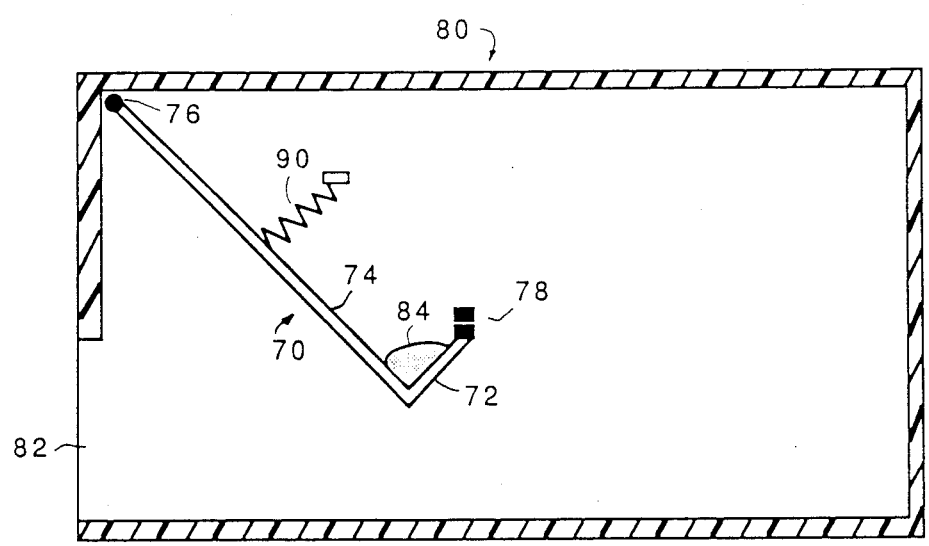
FIG. 4 shows an alternative embodiment in a view similar to FIG. 1, with the door means typically attached to the cage of the trap.

FIG. 4 shows an alternative embodiment wherein the trapping mechanism 70, which comprises platform 72 and door means 74, is pivoted at pivot 76. Trapping mechanism 70 is retained in a set position by retaining means 78. In operation, the animal enters the cage 80 through opening 82 and tries to reach the bait 84. Retaining means 78 does not obstruct the animal from getting at bait 84. The weight of the animal on the trapping mechanism 70 causes the retaining means 78 to release the trapping mechanism 70, which then pivots downwardly towards the opening 82, and substantially obstructs the opening 82. Preferably, a latching means is used to preclude the animal from moving the door means away from the opening 82.

FIG. 4 also discloses the use of a spring means 90 to move the platform from its actuated position to its set position. Such spring means could either act alone, augment the force of gravity, or even act in conjunction with any other type of force, as desired. Additionally, such spring means could also be used in embodiments as disclosed in FIGS. 1 through 3.

Other modifications and alterations may be used in the design and manufacture of the animal trap of the present invention without departing from the spirit and scope of the accompanying claims.

What is claimed is:

1. An animal trap, for catching animals in an unharmed manner, comprising:
    a cage having a top, a bottom, a pair of side walls, a first end wall, and a second end wall;
    an opening in said cage;
    a door means located in said first end wall;
    a platform adapted to receive and retain bait used to attract animals and also adapted to receive at least a portion of the body of an animal to be trapped, said platform having a set position and an actuated position;
    retaining means for retaining said platform in said set position;
    wherein said retaining means releases the platform upon introduction of at least a portion of the weight of said animals, whereby said platform is moved from said set position to said actuated position upon being released;
    wherein said door means has a set position and an actuated position, with said door means being in said set position when said platform is in said set position;
    wherein upon the actuation of said platform, the position of said door means is contingent upon the position of said platform;
    wherein said opening is substantially obstructed by said door means in said actuated position,
    wherein said door means is returned to said set position, after the said cage is turned upside down so as to rest said cage onto its top; and
    wherein said door is returned to said set position with said retaining means.

2. The animal trap of claim 1, wherein the platform is elevated above said bottom of said cage and the platform is moved from said set position to said actuated position by the force of gravity.

3. The animal trap of claim 1, wherein said platform and said door are one integral unit.

4. The animal trap of claim 1, wherein the lowest portion of the opening when the cage is turned upside down is substantially elevated, thereby precluding immediate escape of any trapped animal.

5. The animal trap of claim 4, wherein said door means is adapted to move from its actuated position when said cage is turned upside down.

6. The animal trap of claim 4, wherein said door means is returned to said set position after the said cage is turned upside down.

7. The animal trap of claim 1, wherein said platform slides from said set position to said actuated position.

8. The animal trap of claim 7, wherein said platform is substantially horizontally oriented and said door means is substantially vertically oriented.

9. The animal trap of claim 1, wherein said platform slides from said set position to said actuated position.

10. The animal trap of claim 9, wherein said platform slides vertically from said set position to said actuated position.

11. The animal trap of claim 1, wherein said retaining means comprises a magnet.

12. The animal trap of claim 1, wherein said retaining means is a mechanical release mechanism comprising two mating parts requiring a predetermined amount of force to separate said two parts.

13. The animal trap of claim 1, including latching means in conjunction with said door means whereby said door means must be released from said latching means before it can be moved from the actuated position.

14. The animal trap of claim 13, wherein said latching means is a magnet.

15. The animal trap of claim 1, wherein said platform is moved from said set position to said actuated position by spring means.

* * * * *